Aug. 4, 1931.   A. G. JOHANSSON   1,817,413
BARKING MACHINE
Filed Feb. 14, 1929   2 Sheets-Sheet 2
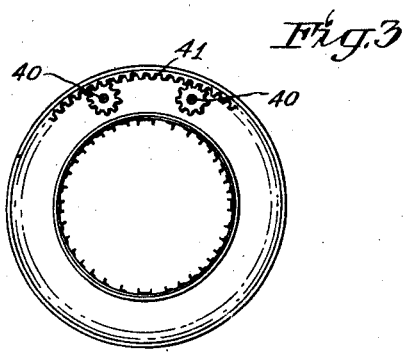
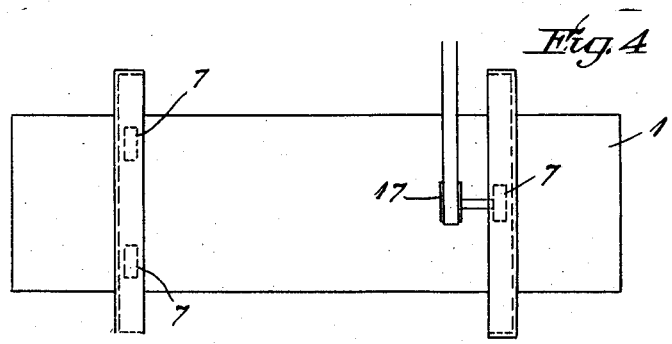
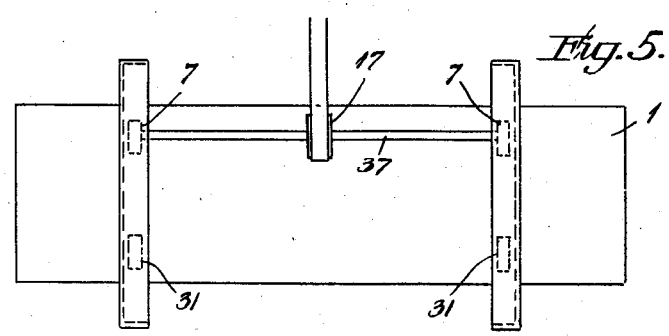
A. G. Johansson
INVENTOR Patented Aug. 4, 1931 1,817,413

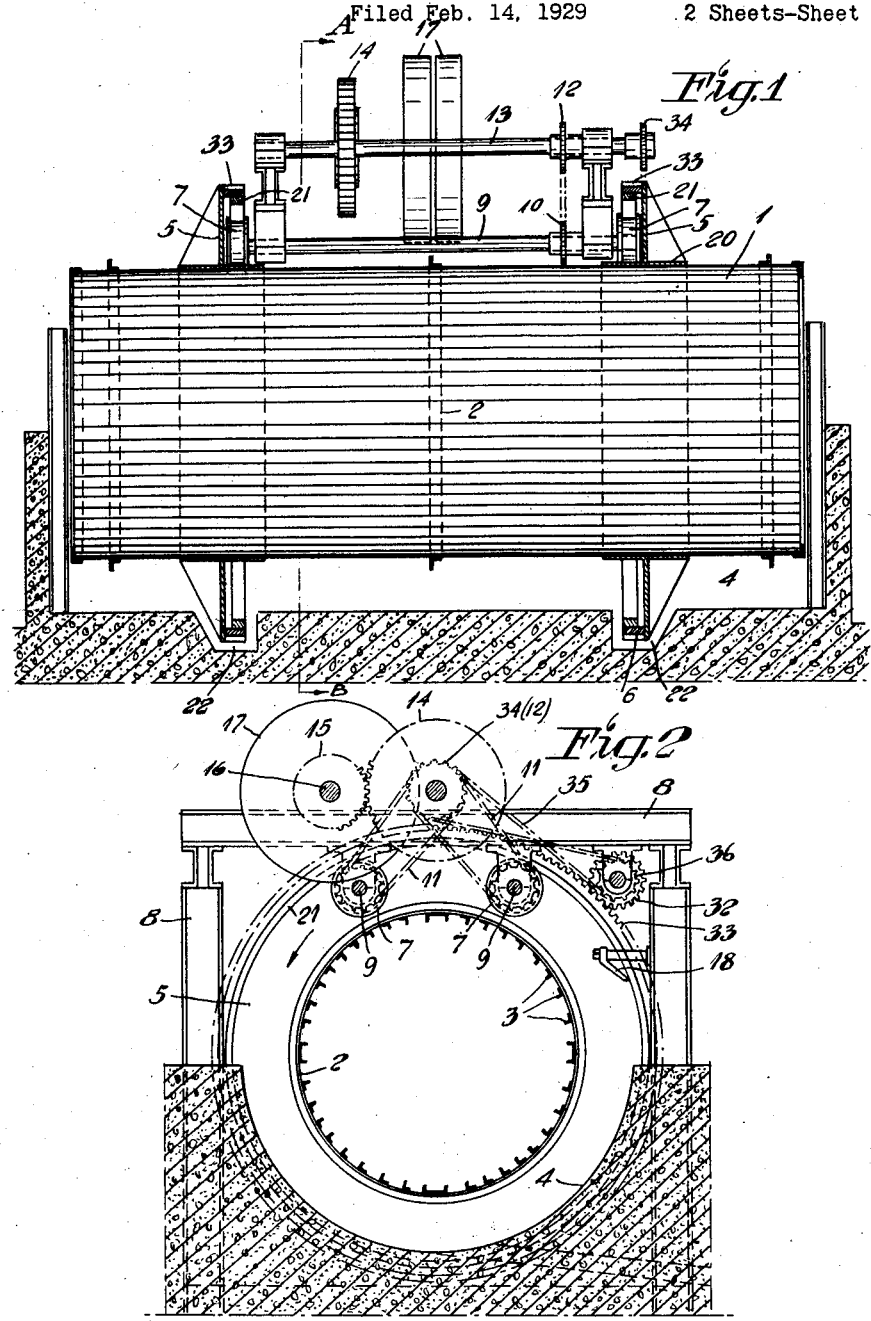

UNITED STATES PATENT OFFICE

AXEL GUSTAF JOHANSSON, OF NALDEN, SWEDEN

BARKING MACHINE

Application filed February 14, 1929, Serial No. 339,982, and in Finland September 15, 1928.

The present invention relates to barking machines of the kind comprising a long horizontal revolving drum which is open at both ends and placed in a container partly filled with water, said drum being further supported by wheels, rollers or the like engaging the inside of the upper halves of annular rings on the drum so as to suspend this latter at points, at least two of which lie on each side of the longitudinal vertical plane of the drum.

The invention consists broadly therein that at least one of the said supporting wheels or the like is a driving wheel adapted to rotate the drum.

By this invention is obtained that simultaneously as the drum is prevented from moving (swinging) laterally by the said supporting and driving wheels all the supporting or driving members can lie above the water in the container, so that the sticking of waste bark in the driving and supporting members or between these and the drum is eliminated and no other means than said supporting wheels or one or more of them are necessary to rotate the drum.

Four embodiments of the invention are shown on the attached drawings where Fig. 1 is a side view of the first embodiment with the container, the said rings and some other parts in section. Fig. 2 is an end view of the same with the drum viewed in section on the line A—B in Fig. 1. Fig. 3 shows the second embodiment from the end of the drum. Figs. 4 and 5 show the third and fourth embodiments from above.

Reference is first made to Figs. 1 and 2. The revolving drum 1 is in known manner constituted by a plurality of rings 2 to which are secured the longitudinally extending bars 3 which, as shown in the drawings, may consist of angle-irons.

The drum is open at both ends and submerged in the fluid container 4. The logs etc. which are to be barked are fed into one end of the drum and put in a tumbling motion by the rotation of the drum, the bark having been softened by the fluid then loosening from the logs which gradually pass out of the drum at the other end of the same.

On the outer side of the drum two cylindrical bands 20 are fixed to which are secured annular flanges or the like 5, for instance by means of angle-irons. Each such flange at its outer border is provided with a ring 6 on the inside of which is arranged a wearing ring 21. If necessary, the ring 21 may be omitted, the inside of the ring 6 itself then forming friction surface.

The elements 5, 6, 20 and 21 can, if necessary, be made in one single piece of cast-iron or steel-castings.

The inside of each ring 21 or 6 forms a circular friction path the upper part of which engages two friction wheels or the like 7, which are arranged on each side of the longitudinal vertical symmetrical plane of the drum. In this embodiment there are thus two parallel friction wheel shafts 9 provided with a friction wheel at each end.

The shafts 9 are journalled in the frame 8, and are each provided with a sprocket 10 which is connected by means of the chains 11 with the sprocket 12 on a shaft 13. This latter is connected by means of a toothed gearing 14, 15 with the main shaft 16 which is provided with driving rope pulleys 17.

By the rotation of the main shaft 16 the friction wheels 7 are thus rotated, and the friction between the latter and the friction paths rigidly connected with the drum causes said drum to revolve.

Preferably a scraper 18 secured to the frame 8 is provided at the upper part of each ring, said scraper engaging the friction surface of the ring 21 and scrapes it clean during the rotation of the drum.

If desired or necessary, a driving toothed wheel 32 can be arranged to gear with a toothed ring 33 on the outside of the flange 5. This toothed wheel 32 is driven from the shaft 13 by means of the sprocket wheel (Fig. 2) the chain 35 and the sprocket wheel 36.

According to Fig. 3 the friction wheels are substituted by toothed wheels 40 gearing with toothed paths 41 formed on the inside of the rings 6 but although a more secure engagement between the wheels and rings is obtained in that way, some of the advantages of the friction gearing are lost, above everything the facility for cleaning the parts.

The gearing for transferring power from the main shaft to the shafts 9 of the friction wheels may of course be of another kind than that shown in the drawing.

In certain cases, especially where very big drums are used, it can be suitable to use more than two wheels 7 for each friction path of the drum.

If desired, only one, two or more of the rings 6 can each cooperate with two or more driving wheels 7.

According to Fig. 4, there is only one wheel 7 at the one end of the drum and this wheel is arranged so as to both drive and suspend the drum while the two wheels at the other end are only suspending wheels.

According to Fig. 5 two opposite coaxially arranged wheels 7 are as well driving as suspending wheels, while 31 are only suspending wheels.

It is to be observed that all wheels are arranged to cooperate with the upper half part of the annular paths on the periphery of the drum. When two opposite coaxially arranged wheels are driving wheels they are preferably attached or made integral with a common shaft (see 13, Fig. 1, and 37, Fig. 5).

The arrangement can also be such, that the one of two wheels, coaxially arranged on each end of a common shaft is secured to or made integral with the shaft, while the other is loosely mounted on the shaft and thus has no driving effect.

What I claim as new and desire to secure by Letters Patent of the United States of America is:—

1. Barking machine consisting of a frame, a horizontal drum adapted to receive the material at one end and delivering it at the other end, means for driving and supporting said drum, all the members of said means which engage the drum cooperating only with the upper half parts of annular paths on the drum, said driving and supporting members comprising two shafts rotatably mounted in the frame, means for rotating said shafts, a wheel on each end of each of said shafts, two annular rings on the drum, said rings being spaced apart in the longitudinal direction of the drum and also spaced from the periphery of the drum, the wheels on the one end of said shafts engaging the inside of the upper half part of the one of said annular rings, while the wheels on the other end of said shafts engage the inside of the upper half part of the other annular ring, said rotary shafts being located one on each side of the longitudinal axial plane of the drum.

2. Barking machine consisting of a horizontal drum adapted to receive the material at one end and delivering it at the other end, a frame, a device for rotating and supporting the drum, all the members of said device which engage the drum consisting solely of driving wheels, annular rings on the drum spaced apart from the periphery thereof, all the said driving wheels only engaging the inside of the upper halves of said rings so as to simultaneously suspend and rotate the drum, and said driving wheels being located on both sides of the longitudinal vertical plane of symmetry of the drum.

3. Barking machine consisting of a horizontal drum adapted to receive the material at one end and delivering it at the other end, two annular rings on the drum, said rings being spaced apart in the longitudinal direction of the drum and also spaced from the periphery of the drum, a frame, the inner side of each of said rings being formed as a friction surface, two shafts rotatably mounted in the frame, friction wheels on both ends of said shafts, said wheels cooperating with the upper half part of said friction surfaces and being the only means engaging the drum to rotate and support it, said wheels being located on both sides of the longitudinal vertical plane of symmetry of the drum, gear wheels on said shafts, a driving shaft, and means for rotating the said gear wheels from said driving shaft.

4. Barking machine consisting of a horizontal drum adapted to receive the material at one end and delivering it at the other end, two annular rings on the drum, said rings being spaced apart in the longitudinal direction of the drum and also spaced from the periphery of the drum, the inner side of said rings being formed as a friction surface, a frame, a device for rotating and supporting the drum, said device comprising two driven shafts rotatably mounted in the frame, a friction wheel on each end of each of said shafts, the friction wheels on the one end of said shafts engaging the inside of the upper half part of the one of said annular rings while the wheels on the other end of said shafts engage the inside of the upper part of the other annular ring, said friction wheels being the only members of said device which engage the drum, said two friction wheel shafts being located on each side of the longitudinal vertical plane of symmetry of the drum.

In testimony whereof I affix my signature.

AXEL GUSTAF JOHANSSON.